(12) United States Patent
Tucker et al.

(10) Patent No.: US 6,590,604 B1
(45) Date of Patent: Jul. 8, 2003

(54) PERSONAL VIDEOCONFERENCING SYSTEM HAVING DISTRIBUTED PROCESSING ARCHITECTURE

(75) Inventors: Mike Tucker, Austin, TX (US); Don Binford, Round Rock, TX (US); Rick Flott, Austin, TX (US); Patrick Vanderwilt, Austin, TX (US); Michael Kenoyer, Austin, TX (US); Jason C. Weaver, Austin, TX (US); Earl Manning, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 0 days.

(21) Appl. No.: 09/545,043

(22) Filed: Apr. 7, 2000

(51) Int. Cl.⁷ .................................................. H04N 7/14
(52) U.S. Cl. ............................... 348/14.13; 348/14.04; 709/204
(58) Field of Search ................ 348/14.01, 14.03–14.04, 348/14.08–14.09, 14.1, 14.12–14.13; 370/260–262; 379/93.08, 93.21, 202; 709/204; 345/540

(56) References Cited

U.S. PATENT DOCUMENTS

| | | | | |
|---|---|---|---|---|
| 5,369,418 A | * | 11/1994 | Richards | 345/540 |
| 5,512,938 A | * | 4/1996 | Ohno | 379/202 |
| 5,541,640 A | | 7/1996 | Larson | |
| 5,926,208 A | * | 7/1999 | Noonen et al. | 348/14.13 |
| 5,936,945 A | * | 8/1999 | Shibata et al. | 370/260 |
| 5,969,750 A | * | 10/1999 | Hsieh et al. | 348/14.1 |
| 6,073,192 A | * | 6/2000 | Clapp et al. | 348/14.08 |
| 6,094,213 A | * | 7/2000 | Mun et al. | 348/14.08 |

* cited by examiner

Primary Examiner—George Eng
(74) Attorney, Agent, or Firm—Carr & Ferrell LLP (57) ABSTRACT

A personal videoconferencing system includes a videoconferencing appliance connected to a personal computer through a Universal Serial Bus (USB) or similar connection. The appliance is provided with a video camera and microphone for generating local video and audio streams. The local video and audio streams are compressed by a video and audio encoder residing at the appliance, and the compressed video and audio streams are conveyed to the personal computer over the USB connection. The appliance may be further provided with an audio decoder for decompressing a remote audio stream received by the personal computer through a network interface and conveyed to the appliance via the USB connection. A video decoder, located on the personal computer, is configured to decompress the local video stream (received through the USB connection) as well as a remote video stream received through the network interface. The decompressed video streams are then sent to a monitor for display to a user. The decompressed audio stream may be played either at a loudspeaker coupled to the audio decoder or at the personal computer.

23 Claims, 7 Drawing Sheets

PERSONAL VIDEOCONFERENCING SYSTEM HAVING DISTRIBUTED PROCESSING ARCHITECTURE

FIELD OF THE INVENTION

The invention relates generally to telecommunications equipment, and more particularly to a personal videoconferencing system.

DESCRIPTION OF THE PRIOR ART

Businesses are making increasing use of videoconferencing systems to enable geographically remote individuals or groups to communicate with each other from their respective locations. By offering the ability to communicate graphic information and to view the facial expressions and gestures of the conference participant(s) located at a remote site, videoconferencing facilitates richer and more natural communication between conference participants when compared to traditional audio-only conferencing. Regular use of videoconferencing avoids or significantly reduces the need for expensive and time-consuming business travel.

Several commercial vendors are presently manufacturing and selling high-quality videoconferencing systems for business use. Such systems tend to be expensive to purchase and maintain, bulky in size, and difficult to configure and operate. Due to the expense and size of business videoconferencing systems, as well as the necessity to connect each system to multiple digital telephone lines, businesses desiring to utilize videoconferencing often purchase a relatively small number of videoconferencing systems for common use of the employees and install each system within a conference room or area, rather than in individual employee's offices. Persons wishing to use a videoconferencing system must typically reserve the associated conference room in advance, and may need to secure the assistance of a system administrator or other IT professional to set up the video call to the remote conferencing site and to configure and operate the videoconferencing system prior to and during the conference. The need to arrange aspects of the videoconference in advance and to travel to the conference room in which the videoconferencing system is situated may dissuade certain persons from availing themselves of the benefits of videoconferencing.

A number of personal videoconferencing devices have been developed and are presently commercially available. These devices typically comprise low resolution video cameras connected to a desktop personal computer through a USB port or similar interface. Raw (unencoded) video generated by the video camera (representative of a user's image), together with raw audio generated by a microphone (representative of the user's speech) are sent to the desktop computer to be encoded prior to transmission of the encoded audio and video data to a remote site through a network interface or modem. The desktop computer also handles decoding of incoming audio and video data received from the remote site, as well as echo cancellation, media stream packetization and call establishment and control.

Because the audio/video encoding and decoding processes tend to be computationally expensive, most desktop computers are limited to low bit-rate videoconferencing. This limitation results in poor image quality and jerky motion (as well as poor speech reproduction), which may distract the user and substantially reduce the videoconferencing device's effectiveness as a communication tool, particularly in a business setting. Video and audio quality may be improved by installing a video capture and processing board in the desktop computer, which handles various processing tasks associated with the audio and video streams. However, many persons, particularly those having limited technical sophistication, may be dissuaded from purchasing and using board-based systems because of the need to open up the desktop case and physically install the board in an appropriate slot on the motherboard. Further, board-based systems may require the user to perform non-trivial configuration of the associated desktop computer to ensure that the board is properly configured and hardware conflicts do not arise.

Thus, a need remains for a personal videoconferencing system which is compact, easy to set up and configure, and which provides business-quality audio and video.

SUMMARY

In accordance with one aspect of the invention, a personal videoconferencing system includes a videoconferencing appliance connected to a personal computer (PC) via a Universal Serial Bus (USB) or comparable communication interface. Processing tasks for implementing videoconferencing services are distributed between an onboard processor located within the appliance and the central processing unit (CPU).of the PC. In particular, the onboard processor handles compression of a locally generated audio stream (typically representative of the speech of the local user), compression of a locally generated video stream (typically representative of an image of the local user), and echo cancellation and decompression of at least one remotely generated audio stream (typically representative of the speech of a remote user).

The compressed local audio and video streams, and the decompressed and echo cancelled remote audio stream, are conveyed to the PC through the USB interface. The compressed local audio and video streams are directed to a network interface for transmission over a network to a remote conference endpoint. The PC also receives compressed remote audio and video streams. The PC is configured to handle decompression of the compressed remote and local video streams, display of the local and remote video streams, and (optionally) playing of the audio stream. The PC additionally handles execution of a user interface, packetization of media streams, call establishment and control operations, and low-level network connectivity tasks.

In preferred embodiments, the videoconferencing appliance and PC perform audio and video compression/decompression and media stream packetization, and call establishment/control operations in accordance with the requirements set forth in the ITU H.323 Recommendation. By utilizing the H.323 protocols, the personal videoconferencing system may intercommunicate with any other H.323-compliant conference endpoints, as well as with (via a gateway) with H.320- and H.321-compliant endpoints.

Use of the distributed processing architecture advantageously enables high quality videoconferencing services to be achieved on a PC or similar platform. Further, by compressing local audio and video streams at the videoconferencing appliance, high quality audio and video may be sent over a standard USB connection without exceeding the connection's bandwidth.

DETAILED DESCRIPTION OF PREFERRED EMBODIMENTS

Figure 1:
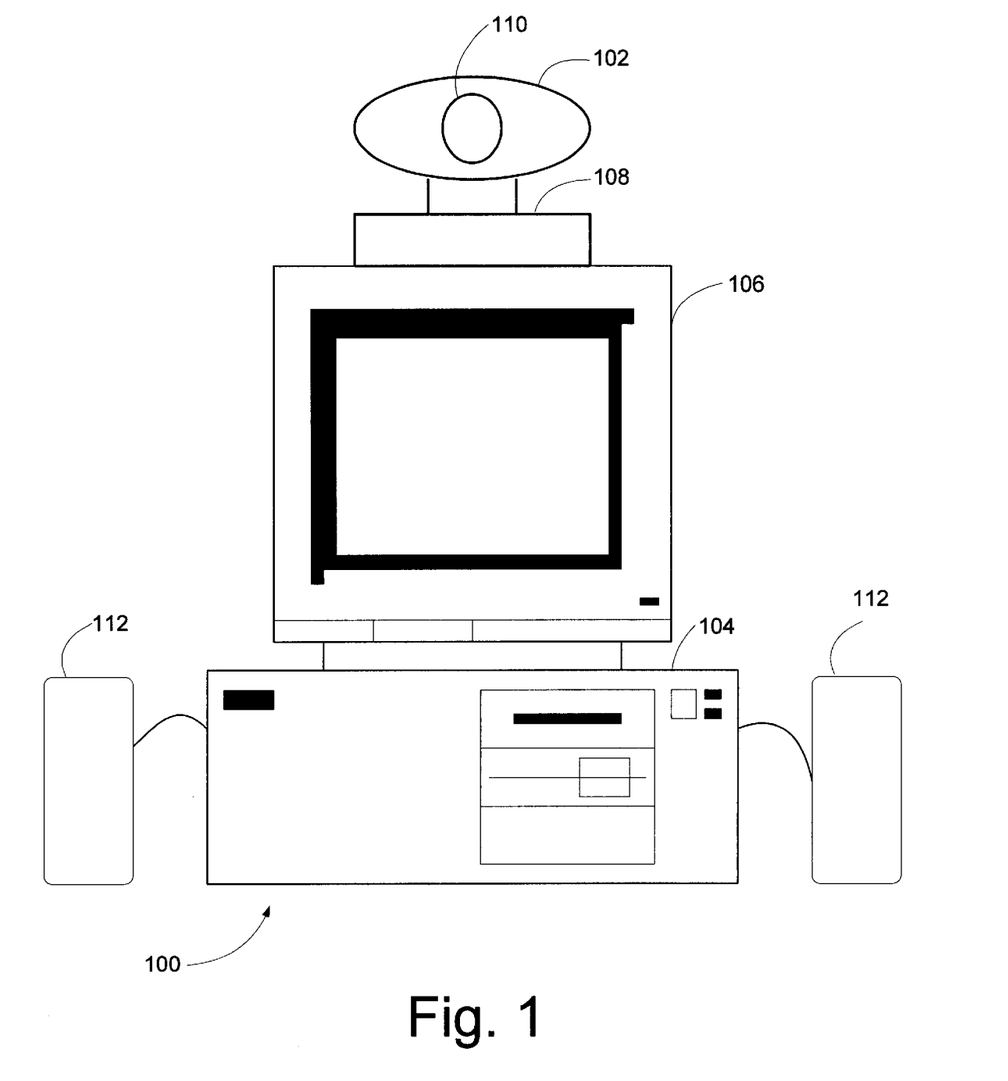
FIG. 1 is a front view of an embodiment of a personal videoconferencing system, in accordance with the present invention.

FIG. 1 shows a front view of a personal videoconferencing system 100 in accordance with an embodiment of the invention. Videoconferencing system 100 generally includes a videoconferencing appliance 102 coupled to a personal computer (hereinafter "PC") 104 via a universal serial bus (USB) or comparable connection. PC 104 is provided with a conventional monitor 106 for displaying images, text and other graphical information to a user. In the FIG.1 embodiment, videoconferencing appliance 102 (hereinafter "appliance") has a base 108 shaped to rest on a top surface of monitor 106. In other embodiments, appliance 102 may be formed integrally with monitor 106.

Appliance 102 is provided with a video camera 110 for continuously capturing an image of a user positioned in front of videoconferencing system 100. In one embodiment, video camera 110 may be manually swiveled and tilted relative to base 108 to properly frame the user's image. Videoconferencing appliance 102 may alternatively be equipped with a conventional camera tracking system (including an electro-mechanical apparatus for adjusting the pan and tilt angle and zoom setting of video camera 110) for automatically aiming the camera at the user based on acoustic localization, video image analysis, or other well-known technique. Video camera 110 may have a fixed-focus lens, or may alternatively include a manual or automatic focus mechanism to ensure that the user's image is in focus. Appliance 102 is further provided with a microphone and an interface for an external loudspeaker (not shown in FIG. 1) for, respectively, generating audio signals representative of the user's speech and for reproducing the speech of one or more remote conference participants. The remote conference participant's speech may alternatively be reproduced at loudspeakers 112 or a headset (not shown) connected to PC 104 through a sound card, or at speakers integrated within PC 104.

Videoconferencing system 100 is generally operative to generate and encode local audio and video streams for transmission to a remote conference endpoint over a packet switched network, and to decode and present remote audio and video streams received from the remote conference endpoint over the network. In accordance with preferred embodiments, videoconferencing system 100 implements the audio/video encoding, media stream packetization, and other related protocols set forth in Recommendation H.323 ("Packet-Based Multimedia Communications Systems") of the International Telecommunication Union (ITU), which is incorporated herein by reference. The components and operation of videoconferencing system 100 are discussed in further detail below in connection with FIGS. 2–6.

Figure 2:
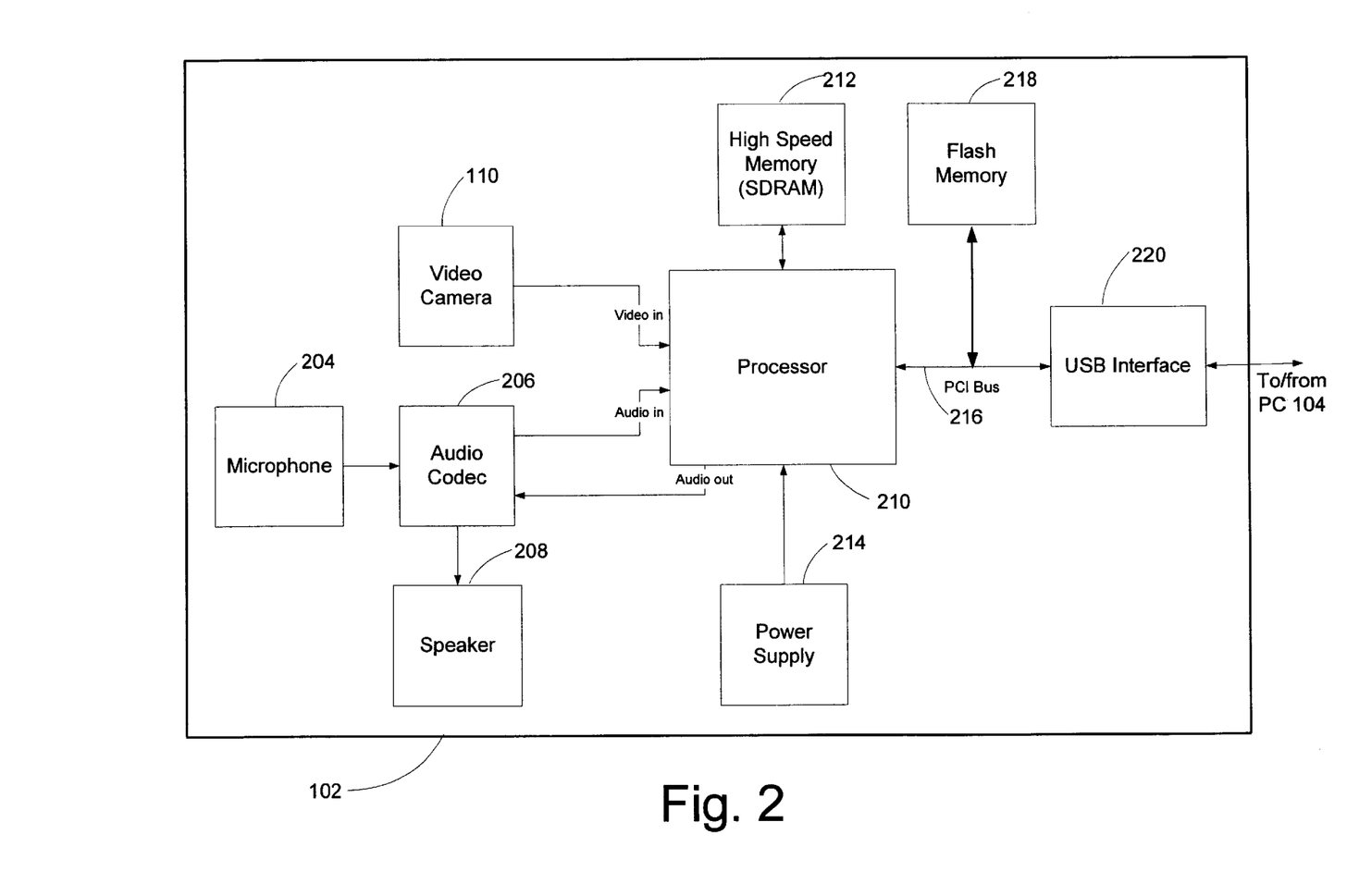
FIG. 2 is a block diagram showing hardware components of a videoconferencing appliance of the FIG. 1 embodiment.

FIG. 2 is a block diagram showing interconnected hardware components of appliance 102. Video camera 110 conventionally includes a sensor and associated optics for continuously capturing the image of the user and generating signals representative of the image. The sensor may comprise a CCD or CMOS sensor, and may be a single sensor having multiple layers, each for sensing a different color channel, or may alternatively comprise multiple individual sensors combined with means (such as a prism or filters) for splitting the incoming light into separate channels. In a preferred embodiment, video camera 110 includes conventional CCIR656-compliant controller circuitry coupled to the sensor for outputting a video data stream in an 8 bit parallel, 4:2:2 YUV time multiplexed format. The resolution of images captured by video camera 110 will typically be 640 by 480 pixels, although other image resolutions may be used. As alluded to above, video camera 110 is preferably provided with conventional positioning and focusing mechanisms adjustable by the user to ensure that the user's image in properly framed and focussed.

Appliance 102 further includes a conventional microphone 204 for sensing the speech of the local user and generating audio signals representative of the speech. Microphone 204 may be integrated within the housing of videoconferencing appliance 102, or may comprise an external microphone or microphone array coupled to videoconferencing appliance 102 by a jack or other suitable interface. Microphone 204 communicates with an audio codec 206, which comprises circuitry or instructions for converting the analog signals produced by microphone 204 to a digitized audio stream. Audio codec 206 is also configured to perform digital-to-analog conversion in connection with an incoming audio data stream so that the speech of the remote user may be reproduced at conventional loudspeaker 208. Audio codec 206 may also perform various other low-level processing of the incoming and outgoing audio signals, such as gain control.

Locally generated audio and video streams from audio codec 206 and video camera 110 are output to a processor 210, which is programmed to encode (compress) the audio and video streams for subsequent delivery to the remote conference endpoint(s) over the packet-switched network. Processor 210 may comprise, for example, the Trimedia™ TH-1300 programmable media processor available from Philips Semiconductors of Sunnyvale, Calif. Processor 210 is generally configured to read in audio and video data from codec 206 and video camera 110, to compress and perform other processing operations on the audio and video data, and to output compressed audio and video streams to a PCI bus 216. Processor 210 is additionally configured to receive as input through PCI bus 216 an incoming (remote) compressed audio stream representative of the speech of a remote conference participant, to decompress and otherwise process the incoming audio stream and to direct the decompressed audio stream to audio codec 206/speaker 208 so that the remote speech may be reproduced at appliance 102. Processor 210 is powered by a conventional power supply 214, which may also power various other hardware components. Processing of the outgoing audio and video streams and incoming audio stream will be discussed in more detail in connection with FIGS. 4–6.

Processor 210 is coupled to high-speed memory 212, which stores (during operation of appliance 102) data and instructions for carrying out processing of the outgoing and incoming audio and video streams. In one embodiment, high-speed memory 212 comprises 16 MB of synchronous DRAM (SDRAM) coupled to processor 210 by a 32-bit bus. Compressed local audio and video streams are output from processor 210 to a PCI bus 216 through an internal bus interface, which also receives the incoming compressed audio stream transmitted over PCI bus 216.

Appliance 102 may be further provided with non-volatile memory 218 coupled to PCI bus 216. Non-volatile memory 218, which may comprise flash memory or programmable ROM, stores low-level operating and boot code for uploading program instructions from PC 104 during system start-up and/or upon the occurrence of other predetermined events. A universal serial bus (USB) interface 220, which includes an external connector attachable to a cable extending between interface 220 and a corresponding interface located at PC 104, is coupled to PCI bus 216 to enable bi-directional communication between appliance 102 and PC 104. Use of a USB connection advantageously allows appliance 102 to be "hot-plugged", thereby avoiding the need to restart PC 104.

Figure 3:
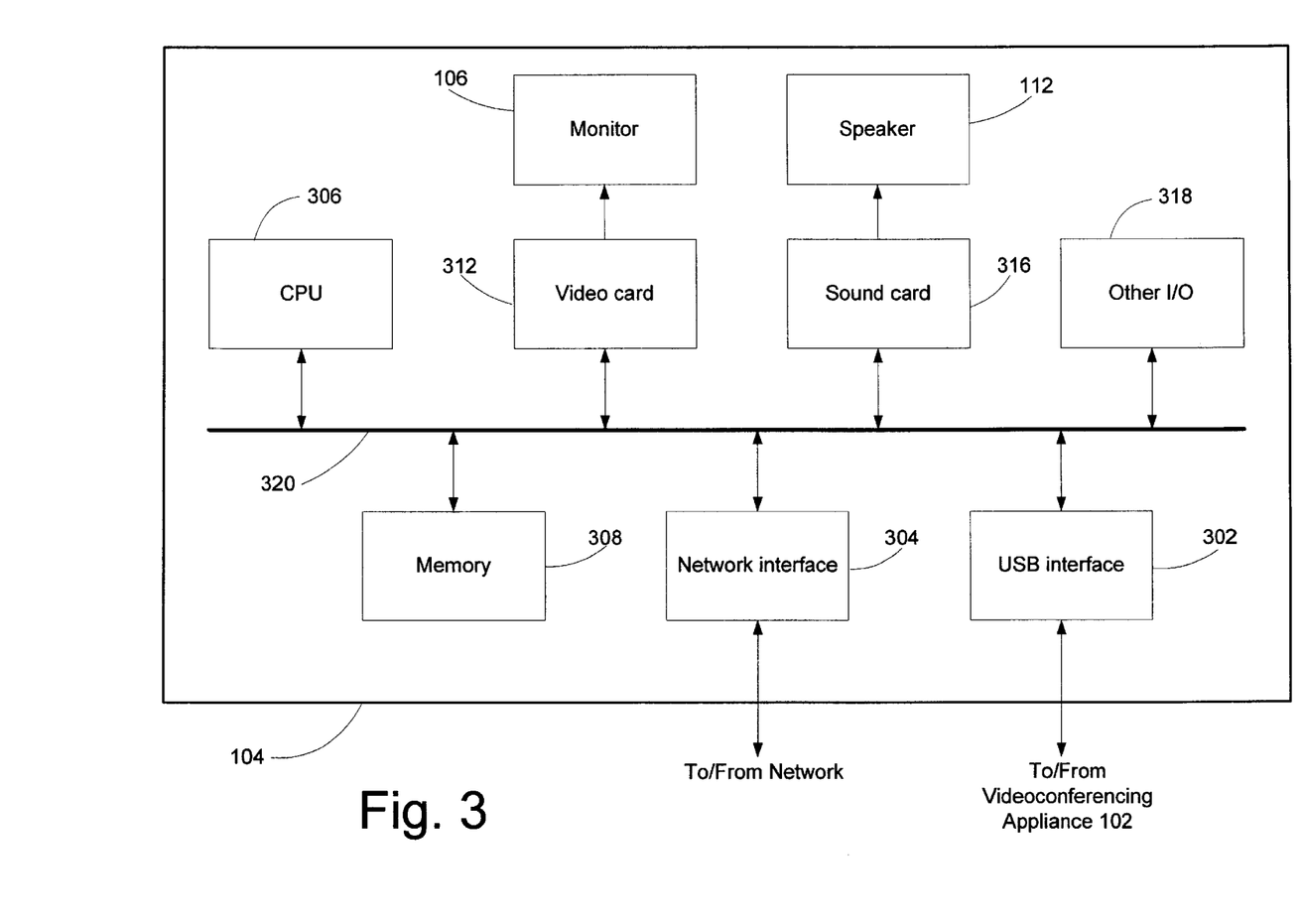
FIG. 3 is a block diagram showing hardware components of a personal computer of the FIG. 1 embodiment.

FIG. 3 is a block diagram showing hardware components of PC 104. A USB interface 302, coupled to corresponding USB interface 220 of appliance 102, sends and receives audio and video streams and related control information to and from appliance 102. PC 104 is further provided with a network interface 304 to enable communication between videoconferencing system 100 and.other network-connected devices, such as another remote videoconferencing endpoint. Network interface 304 will typically comprise an Ethernet card which is connected to a local area network (LAN), cable modem, digital subscriber line (DSL) modem, or other suitable network access device.

CPU 306, which may comprise an Intel® Pentium®-class or other suitable processor, is generally operative to execute program instructions and manage hardware resources. In accordance with the distributed processing architecture of videoconferencing system 100, CPU 306 handles decoding of locally and remotely generated video streams, display of the decoded video streams on monitor 106, media stream packetization, call establishment and control, network connectivity operations, data conferencing tasks, and execution of a user interface (whereas processor 210 of appliance 102 handles encoding of locally generated audio and video streams and decoding of the remotely generated audio stream(s)).

Memory 308 stores program instructions and data for execution and processing by CPU 306. Memory 308 may variously comprise any suitable one or combination of volatile memory such as DRAM, non-volatile memory such as ROM, and storage devices such as hard drives and CD-ROMs. CPU 306 may also be provided with high-speed cache memory to reduce memory read operations and thereby accelerate program execution.

Decompressed video streams are directed to monitor 106 to be displayed to the user. Monitor 106, which may comprise a conventional CRT or LCD monitor, is coupled to a video card 312, which performs frame buffering, color space conversion, and other low-level video processing operations necessary to drive monitor 106. Alternatively, functions of video card 312 may be performed by CPU 306. PC 104 may optionally be provided with loudspeakers 112 or a headset, coupled to a sound card 316, for playing the decoded remote audio stream such that the speech of the user of a remote conference endpoint is reproduced at PC 104. Sound card 316 may additionally receive and digitize input from an external microphone (not shown). Finally, PC 104 is typically provided with other input/output devices 318, such as a keyboard, mouse, printer and the like for entering user input and/or presenting or recording output. The various hardware components of PC 104 are interconnected by at least one system bus 320.

Figure 4A:
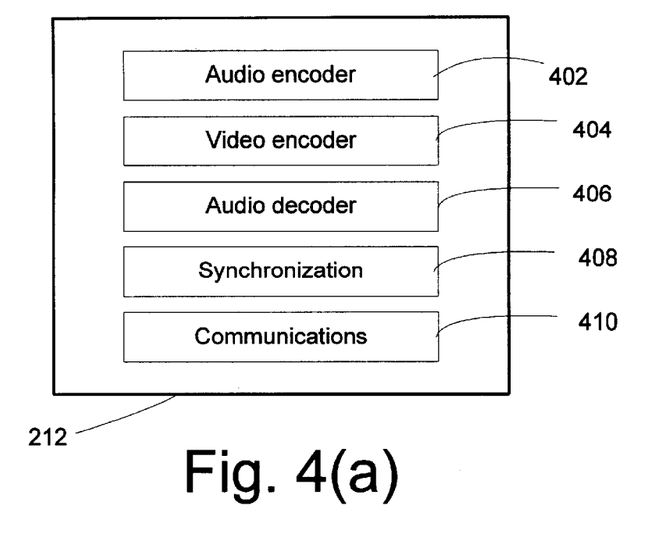
FIG. 4(a) is a block diagram showing software components of the videoconferencing system stored in the appliance memory.
Figure 4B:
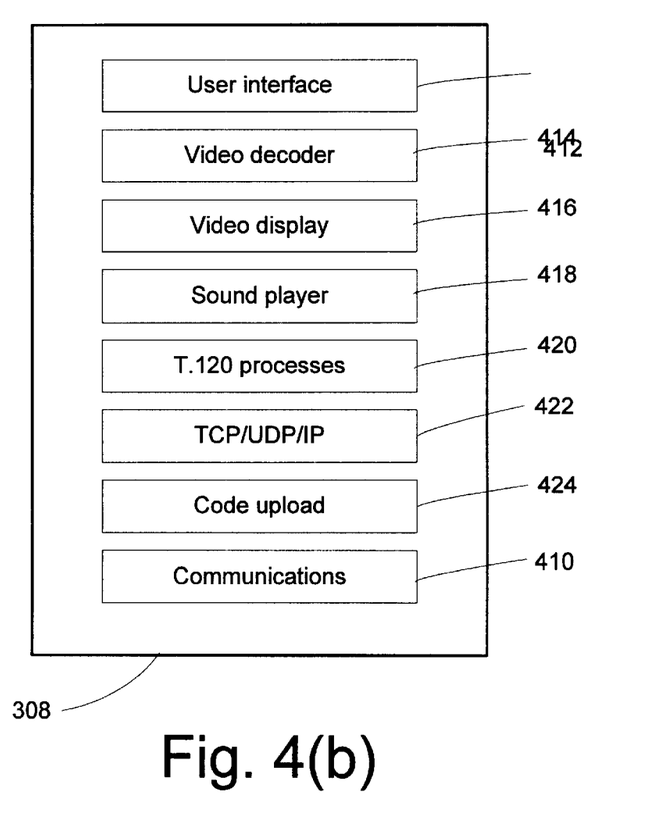
FIG. 4(b) is a block diagram showing software components of the videoconferencing system stored in the personal computer memory.

FIGS. 4(a) and 4(b) depict software components of videoconferencing system 100 residing, respectively, in high-speed memory 212 of appliance 102 and memory 308 of PC 104. Those skilled in the art will recognize that the software components of videoconferencing system 100 will be designed to run in a particular video software environment, such as Video for Windows from Microsoft Corporation, or QuickTime from Apple Computer. However, videoconferencing system 100 should not be construed as being limited to a particular video environment, operating system, or platform.

Referring initially to FIG. 4(a), software components residing (during operation of videoconferencing system 100) at appliance 102 include audio encoder 402, video encoder 404, audio decoder 406, synchronization routines 408, and communications processes 410. In a preferred embodiment, software components residing at appliance 102 are configured as drivers which are stored in non-volatile memory 308 (typically as files stored on a hard drive) of PC 104 and uploaded to memory 202 of appliance 100 at system start-up or upon occurrence of certain events. This arrangement obviates the need to install high-capacity non-volatile memory in appliance 104 and facilitates software updates.

The software components residing at appliance 102 are generally configured to implement the various functions set forth in the H.323 Recommendation, so as to enable interoperability with any other H.323-compliant remote conference endpoint. Video encoder 404 comprises instructions for encoding quarter common intermediate format (QCIF) images in the local video stream supplied by video camera 110 in accordance with Recommendation H.261("Video Codec for Audiovisual Services at px64 kbit/s", incorporated herein by reference) of the ITU. As is known in the art, H.261 utilizes a discrete cosine transform-based predictive encoding scheme to achieve compression of the video stream. Video encoder 404 may be additionally configured to support alternative video encoding protocols, such as H.261 common intermediate format (CIF), H.263, or proprietary formats.

Audio encoder 402 comprises instructions for applying the encoding protocol of ITU Recommendation G.711 ("Pulse Code Modulation (PCM) of Voice Frequencies") to the local audio stream generated by microphone 204/audio codec 206. The G.711 protocol utilizes a PCM scheme to compress the local audio stream. Audio encoder 402 may be configured to support additional audio encoding algorithms, such as MPEG-1 audio and ITU Recommendations G.722, G.728, G.729 and G.723.1 or other proprietary or non-proprietary algorithms.

Audio decoder 406 comprises program instructions for decoding one or more incoming compressed audio streams received from remote conference endpoints. Audio decoder 406 is configured to decode audio streams encoded in accordance with the G.711 protocol, and may additionally be configured to decode audio streams encoded using other protocols, such as G.722, G.728, G.729, G.723.1, and MPEG-1 audio. Synchronization routines 408 comprise program instructions for delaying the decoded audio stream output by audio decoder 406 to maintain lip synchronization of the speech and images received from the remote conference endpoint(s)

In accordance with preferred embodiments of videoconferencing system 100, audio decoder 406 is additionally configured to apply an echo cancellation algorithm to the incoming audio stream to remove components of the incoming audio signal attributable to acoustic feedback between the loudspeaker and microphone located at the remote conferencing terminal. Since echo cancellation techniques are well known in the art, they need not be discussed in detail herein. Generally, echo cancellation involves the use of an adaptive filter that generates an approximation of the acoustic feedback (comprising a delayed and weighted version of the locally generated audio stream), which is in turn subtracted from the remote audio stream. The filter's tap weights may be updated using any one of a number of existing algorithms.

Audio encoder 402 and audio decoder,406 may be configured to apply other well-known processes to the incoming and outgoing audio streams in order to improve audio quality. By way of non-limiting examples, these processes may include automatic gain control and dynamic noise reduction.

Communications processes 410 include instructions for implementing the media stream packetization functions of ITU Recommendations H.225.0 ("Call Signalling Protocols and Media Stream Packetization for Packet-Based Multimedia Communication Systems") and H.245 ("Control Protocol for Multimedia Communications") which are incorporated by reference. The protocols set forth in the H.225.0 and H.245 Recommendations are well known in the art, and hence a detailed description of the functions implemented by communications processes 410 is not included. Generally, communications processes 410 handles packetization of encoded audio and video streams in accordance with Real-Time Protocol (RTP), capability exchange, opening/closing of audio and video channels, mode changes, flow control, and general commands and indications. As discussed below, communications processes 410 may alternatively reside in memory 308 of PC 104.

It should be noted that, although the various software components 402–410 are depicted in FIG. 4(a) as being separate entities, the functionality embodied by any two or more components may be integrated into a single component without departing from the scope of the invention.

FIG. 4(b) depicts software components of videoconferencing system 100 residing in memory 308 of PC 104. A user interface 412, the details of which are outside the scope of the invention, is provided to present information to the user and to allow the user to control various aspects of a video conference. Exemplary user controls may include volume and mute controls for the audio portion of the conference, window size and configuration controls for the video portion of the conference, and call establishment/termination controls for initiating and breaking down calls to selected remote conference endpoints.

Video decoder 414 includes instructions for decoding local and remote video streams encoded in accordance with the H.261 QCIF protocol. Video decoder 414 may additionally comprise instructions for decoding video streams encoded using alternative protocols, such as H.261 CIF, H.263, or proprietary protocols.

Video display module 416 and sound player 418 comprise instructions for, respectively, displaying decoded local and remote video streams on monitor 106, and playing decoded remote audio streams via speaker 314. In a typical video environment (such as Video for Windows), video display module 416 and sound player 418 will be embedded within an operating system running on PC 104 and will be accessible through an API.

PC 104 may additionally be provided with T.120 processes 420 comprising instructions for implementing data sharing with remote conference endpoints in accordance with the protocols set forth in ITU Recommendation T.120 ("Data Protocols for Multimedia Processing"), which is incorporated by reference. In brief, T.120 processes enable the exchange of file-specific data (file transfers, application sharing, etc.) Over a standard-compliant channel.

A conventional network layer, such as TCP/UDP/IP stack 422, handles low-level network connectivity tasks including establishment and tear-down of reliable (e.g., TCP) and unreliable (e.g., UDP) channels for communication of control information and audio and video streams with remote conference endpoints. TCP/UDP/IP stack 422, which will typically be embedded in an operating system executing on PC 104, may also handle error checking and control and addressing functions in connection with communications received and transmitted through network interface 304.

Code upload module 424 comprises instructions for uploading audio encoder 402, video decoder 404, audio decoder 406, synchronization routines 408 and communications processes 410 to high-speed memory 212 via the USB connection coupling USB interfaces 220 and 302. As discussed above, uploading of the software components from memory 308 to high-speed memory 212 will typically be effected upon system start-up or upon the occurrence of certain pre-specified events.

Finally, communications processes 410, described above in connection with FIG. 4(a), may alternatively or additionally reside in memory 308 for execution by CPU 306.

Figure 5:
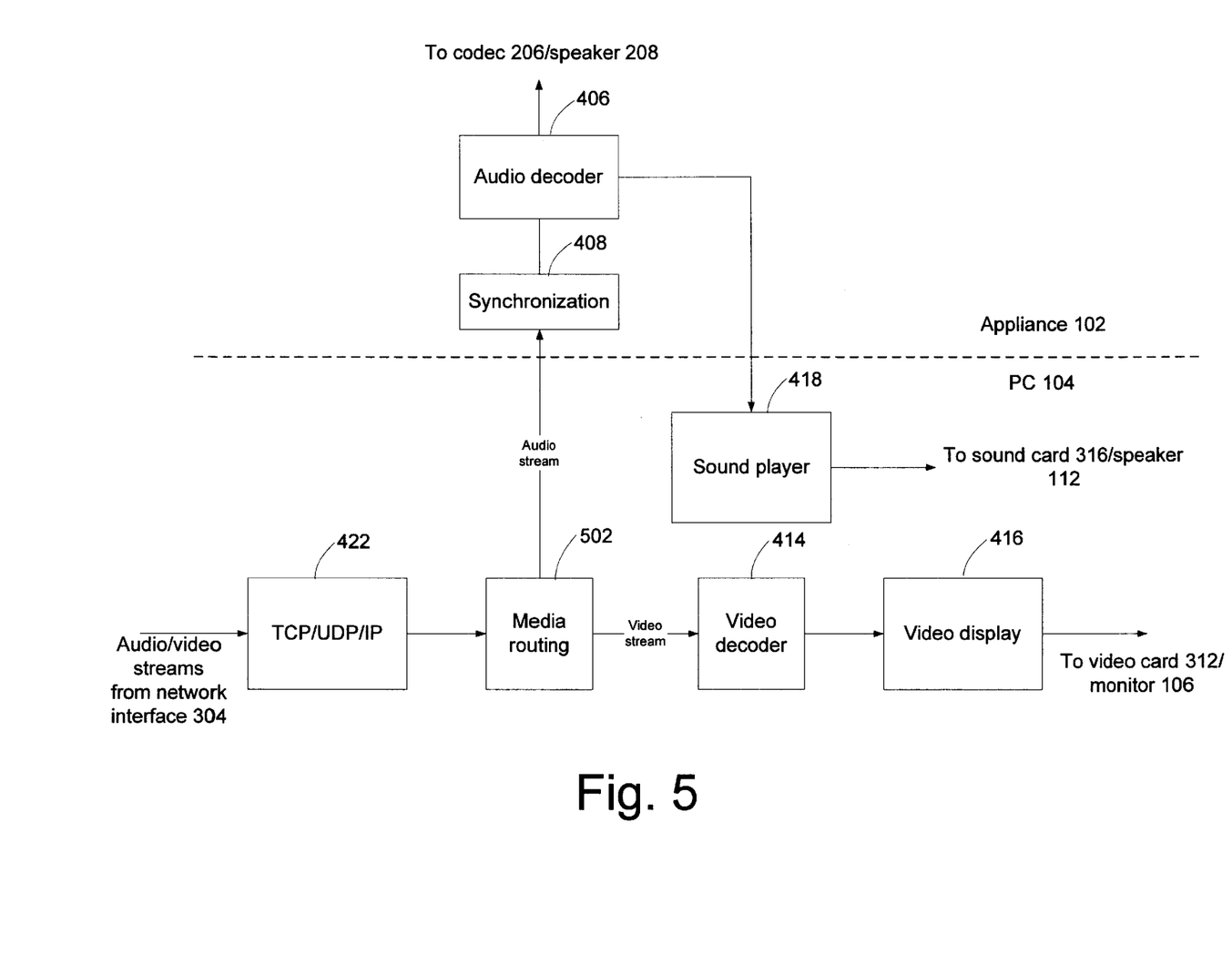
FIG. 5 is a block diagram showing the flow of outgoing (local) audio and video streams through various software components.

FIG. 5 is a block diagram depicting the path of incoming (remote) audio and video streams through various software components residing in PC 104 and appliance 102. The incoming audio and video streams, which are representative of the speech and images transmitted by one or more remote conference endpoints, are received through network interface 304 and initially processed by TCP/UDP/IP stack 422 which performs (inter alia) error checking functions and strips header information from the incoming media streams. The audio and video streams are then directed to a media routing filter 502, which sends (via the USB connection) the audio stream(s) to synchronization routines 408 and audio decoder 406 located at appliance 102. If multiple incoming audio streams are received (indicative of a multi-point conference), audio decoder 406 may also perform mixing or switching of the audio streams. As discussed above, audio decoder 406 may also apply an echo cancellation algorithm to the incoming audio stream to remove components of the stream attributable to acoustic coupling between the microphone and loudspeaker at the remote conference endpoint.

The decoded audio stream(s) is then directed to audio codec 206 for conversion to an analog signal, which is in turn applied to loudspeaker 208, which reproduces the speech of the user(s) of the remote conference endpoint(s). Audio decoder 406 may also direct through the USB connection a copy of the decoded audio stream to sound player 418, which causes the remote speech to be reproduced at PC 104 via sound card 316 and loudspeaker 112.

The incoming video stream(s) is sent to video decoder 414, which decodes the video stream, and may additionally perform mixing or switching services in the case of multiple video streams. The decoded video stream is subsequently passed to video display module 416, which causes the images embodied in the decoded video stream to be displayed in a window on monitor 106.

Figure 6:
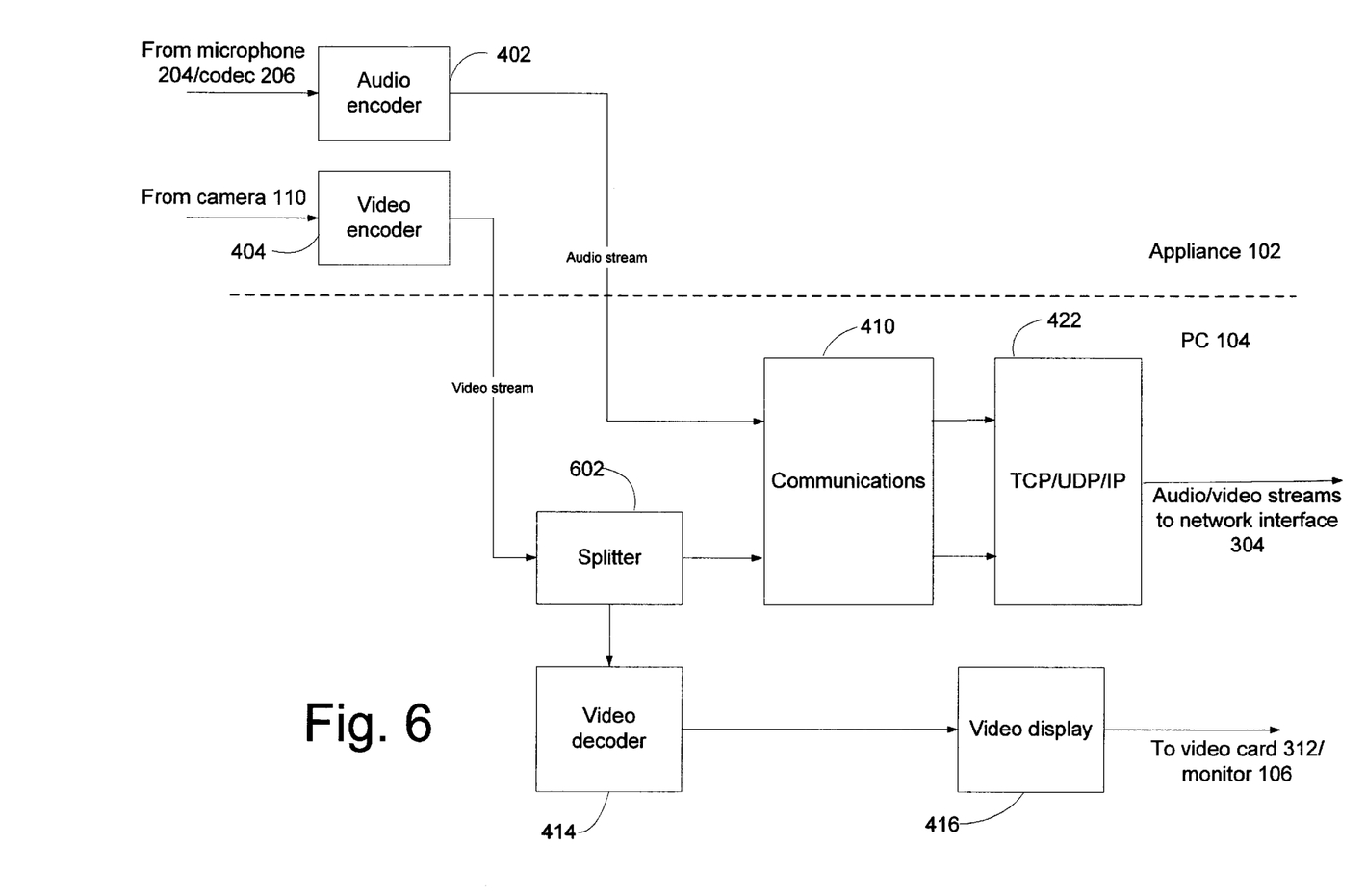
FIG. 6 is a block diagram showing the flow of incoming (remote) audio and video streams through various software components.

FIG. 6 is a block diagram showing the path of the local (outgoing) audio and video streams through various software components. The local audio stream generated by microphone 204 and digitized by audio codec 206 is encoded by audio encoder 402 (alternatively, the local audio stream may be generated by an external microphone coupled to sound card 316 and then passed on to audio encoder 402). Similarly, the local video stream generated by video camera 110 is passed to video encoder 404, which encodes the video stream in accordance with the appropriate protocol.

The encoded audio stream is then sent over the USB connection to communications processes 410. The encoded video stream is conveyed to a splitter 602 over the USB connection. Splitter 602 directs one copy of the video stream.to communications processes 410. A second copy of the local video stream is directed by splitter 702 to video decoder 414, which decodes the video stream and passes the decoded video stream to video display module 416. Video display module 416 in turn causes the images embodied in the local video stream to be displayed in a window on monitor 106.

Communications processes 410 packetizes the audio and video streams and passes them to TCP/UDP/IP stack 422, which attaches header information to the audio and video streams, and places the streams on network interface 304 for transmission to one or more remote conference endpoints over the network.

It is to be appreciated that the distributed software and hardware architecture of videoconferencing system 100, which implements compression of the local (outgoing) audio and video streams at appliance 102, enables high-quality video and audio streams to be transmitted over a (relatively low bandwidth) USB connection. Further, by locating audio and video encoding and video decoding operations at appliance 100, the resources of CPU 306 are not unduly taxed.

Figure 7:
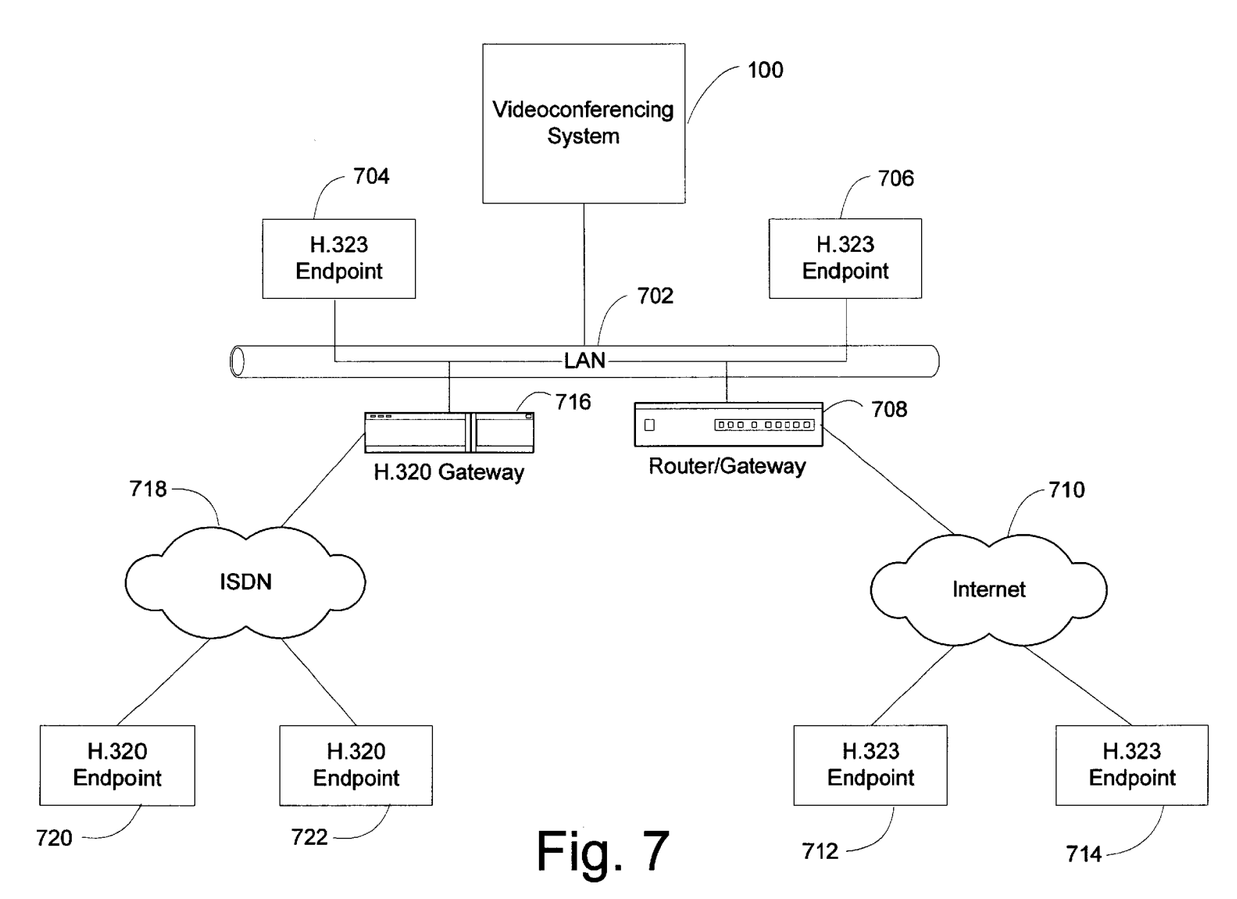
FIG. 7 is a diagram showing an exemplary network environment of the personal videoconferencing system.

FIG. 7 depicts an exemplary network environment of videoconferencing system 100. Videoconferencing system 100 is coupled to LAN 702, which may typically comprise an Ethernet-based network, through network interface 304. H.323-compliant endpoints 704 and 706 are located at other nodes of LAN 702. H.323 endpoints 704 and 706 may comprise other personal videoconferencing systems according to the present invention, or may alternatively comprise any. suitable H.323 compliant group or personal videoconferencing system.

Router or gateway 708 is located at a node of LAN 702 and is configured to enable communication over Internet 710 (or a wide area network) between LAN connected devices, such as videoconferencing system 100, and devices located outside of LAN 702, such as H.323 endpoints 712 and 714. To allow videoconferencing system 100 to communicate with conventional H.320-compliant conference endpoints 720 and 722(which receive and transmit multiplexed audio/video streams over circuit switched ISDN lines 718), an H.320 gateway 716 may be provided and connected to packet-switched LAN 316. As is known in the art, H.320 gateway 718 provides protocol conversion services required to implement real-time bi-directional communication between H.320 and H.323 compliant endpoints.

Videoconferencing system 100 is preferably configured to receive and process audio and video streams from a plurality of remote conference endpoints (e.g., H.323 endpoints 704, 706, 712, 714 and/or H.320 endpoints 720, 722) to thereby enable multi-point conferencing. The total number of separate audio/video streams which may be concurrently received and processed by videoconferencing system 100 will depend, at least in part, on considerations of bandwidth and processor (onboard processor 210 and CPU capabilities. One or more multi-point control units (MCUs) may be employed to combine or switch multiple audio/video streams and thus expand the number of conference endpoints which may participate in a conference.

While reference is made throughout the foregoing description to an H.323-compliant videoconferencing system, it should be appreciated that the invention should not be construed to be limited thereto. Those skilled in the art will recognize that videoconferencing system 100 may be adapted to implement any number of packet-based protocols. Further, videoconferencing system 100 may also be easily configured to support video telephony employing the standard Session Initiation/Media Gateway Control (SIP/MGCP) protocols.

It will also be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

What is claimed is:

1. A videoconferencing appliance connected externally from a personal computer for decompressing non-video signals, said personal computer including a network interface for receiving compressed remote audio and video streams from a remote conference endpoint and a processor for distributing compressed remote audio stream to the videoconferencing appliance via a first communication interface for decompression so that the first communication interface directs the remote audio stream away from said personal computer, the video conferencing appliance comprising:

a microphone for generating a local audio stream;
a video camera for generating a local video stream;
an audio encoder, coupled to the microphone, for compressing the local audio stream;
a video encoder, coupled to the video camera, for compressing the local video stream;
a second communication interface, coupled to the audio and video encoders and the first communication interface, for conveying the compressed local audio and video streams to said personal computer and for receiving the remote audio stream from said personal computer; and
an audio decoder for decompressing the compressed remote audio stream received from said personal computer through the second communication interface.

2. The videoconferencing appliance of claim 1, wherein the audio decoder is configured to echo cancel the remote audio stream.

3. The videoconferencing appliance of claim 1, wherein the audio encoder, video encoder, and audio decoder comprise program instructions executed by an onboard processor.

4. The videoconferencing appliance of claim 1, wherein at least a portion of the program instructions normally reside on the personal computer, and are uploaded to the videoconferencing appliance through the communication interface upon the occurrence of a predetermined event.

5. The videoconferencing appliance of claim 1 further comprising a communications process for packetizing the compressed audio and video streams and for establishing and controlling calls.

6. The videoconferencing appliance of claim 1 further comprising a loudspeaker, coupled to the audio decoder, for playing the decompressed remote audio stream.

7. The videoconferencing appliance of claim 1, wherein the communication interface comprises a Universal Serial Bus (USB) interface.

8. The videoconferencing appliance of claim 1, wherein the audio decoder is configured to transfer the decompressed remote audio stream to the personal computer to be played thereby.

9. The videoconferencing appliance of claim 3, wherein the program instructions implement H.323 protocols.

10. The videoconferencing appliance of claim 1, wherein the microphone is external to a housing of the appliance and is removably coupleable to the audio encoder via a microphone interface.

11. A video conferencing system having distributed processing architecture, comprising:
   a personal computer including:
   a network interface for receiving the compressed remote audio and video streams from a remote conference endpoint and for transmitting compressed local audio and video streams to the remote endpoint;
   a processor for decoding compressed remote video stream and for distributing compressed remote audio stream to a video conferencing appliance for decompression;
   a video decoder for decompressing the compressed remote video stream;
   a monitor, coupled to the video decoder, for displaying the decompressed remote video stream; and
   a first communication interface for conveying the compressed remote audio stream to the videoconference appliance and for directing the remote audio stream away from the personal computer;
   the video conference appliance including:
   a microphone for generating a local audio stream;
   a video camera for generating a local video stream;
   an audio encoder, coupled to the microphone, for compressing the local audio stream;
   a video encoder, coupled to the video camera, for compressing the local video stream;
   a second communication interface, coupled to the audio and video encoders and the first communication interface, for conveying the compressed local audio and video streams to the personal computer and for receiving the remote audio stream from said personal computer; and
   an audio decoder for decompressing the compressed remote audio stream received from the personal computer through the second communication interface.

12. The videoconferencing system of claim 11, wherein the audio decoder sends the decompressed remote audio stream to the personal computer through the first and second communication interfaces.

13. The videoconferencing system of claim 11, wherein the first and second communication interfaces comprise Universal Serial Bus (USB) interfaces.

14. The videoconferencing system of claim 11, wherein the audio encoder, video encoder, and audio decoder comprise program instructions executed by a processor disposed at the videoconferencing appliance.

15. The videoconferencing system of claim 11, wherein the video decoder comprises program instructions executed by a processor disposed at the personal computer.

16. The videoconferencing system of claim 11, wherein the videoconferencing appliance further comprises a communications process for packetizing the compressed audio and video streams and for establishing and controlling calls.

17. The videoconferencing system of claim 16, wherein the audio and video encoders, audio decoder, and communications process are configured to implement H.323 protocols.

18. The videoconferencing system of claim 14, wherein at least a portion of the program instructions normally reside on the personal computer, and are uploaded to the videoconferencing appliance through the first and second communication interfaces upon the occurrence of a predetermined event.

19. The videoconferencing system of claim 12, wherein the personal computer is coupled to a loudspeaker for playing the remote audio stream.

20. The videoconferencing system of claim 11, wherein the audio decoder is configured to echo cancel the remote audio stream.

21. The videoconferencing system of claim 11, wherein the personal computer includes a user interface having a set of user controls.

22. The videoconferencing system of claim 11, wherein the personal computer includes a TCP/UDP/IP stack for managing communications with a remote conference endpoint over the network.

23. The videoconferencing system of claim 11, wherein the microphone is external to a housing of the appliance and is removably coupleable to the audio encoder via a microphone interface.

* * * * *